United States Patent [19]
Jenniges

[11] 3,907,979
[45] Sept. 23, 1975

[54] LOW $SO_2$ EMISSION SULFURIC ACID PROCESS FORM SULFUR AND OXYGEN

[75] Inventor: Ernst Jenniges, Cologne-Hohenberg, Germany

[73] Assignee: Chemiebau Dr. A. Zieren GmbH & Co. KG, Cologne-Mungersdorf, Germany

[22] Filed: May 14, 1973

[21] Appl. No.: 359,726

[30] Foreign Application Priority Data
May 12, 1972 Germany............................ 2223131

[52] U.S. Cl. ................ 423/522; 423/533; 423/542
[51] Int. Cl.² .................... C01B 17/76; C01B 17/54
[58] Field of Search ........... 423/522, 525, 526, 528, 423/529, 532, 533, 535, 542

[56] References Cited
UNITED STATES PATENTS

| | | | |
|---|---|---|---|
| 1,344,905 | 6/1920 | Laist et al. ........................... | 423/542 |
| 1,520,093 | 12/1924 | Shapleigh ............................ | 423/523 |
| 1,789,460 | 1/1931 | Clark .................................... | 423/533 |
| 2,128,108 | 8/1938 | Tyrer et al. .......................... | 423/522 |
| 3,350,169 | 10/1967 | Rinckhoff ............................. | 423/522 |
| 3,432,263 | 3/1969 | Ohsol.................................... | 423/529 |
| 3,454,356 | 7/1969 | Raman.............................. | 423/535 X |
| 3,615,196 | 10/1971 | Welty, Jr. ........................ | 423/535 X |
| 3,671,194 | 6/1972 | Roberts................................ | 423/522 |

FOREIGN PATENTS OR APPLICATIONS

| | | | |
|---|---|---|---|
| 993,412 | 5/1965 | United Kingdom................. | 423/522 |
| 258,974 | 10/1926 | United Kingdom | |

OTHER PUBLICATIONS

Snowball, A. F., A cyclic process of sulfuric acid manufacture at Trail, B. C., Canadian Chemistry and Process Industries, Dec. 1947, pp. 1111–1114.

Primary Examiner—Oscar R. Vertiz
Assistant Examiner—Gary P. Straub
Attorney, Agent, or Firm—Millen, Raptes & White

[57] ABSTRACT

This invention relates to a process for the production of sulfuric acid from sulfur and technical oxygen or oxygen-enriched air by sulfur combustion and contact oxidation of the sulfur combustion gas.

11 Claims, 1 Drawing Figure

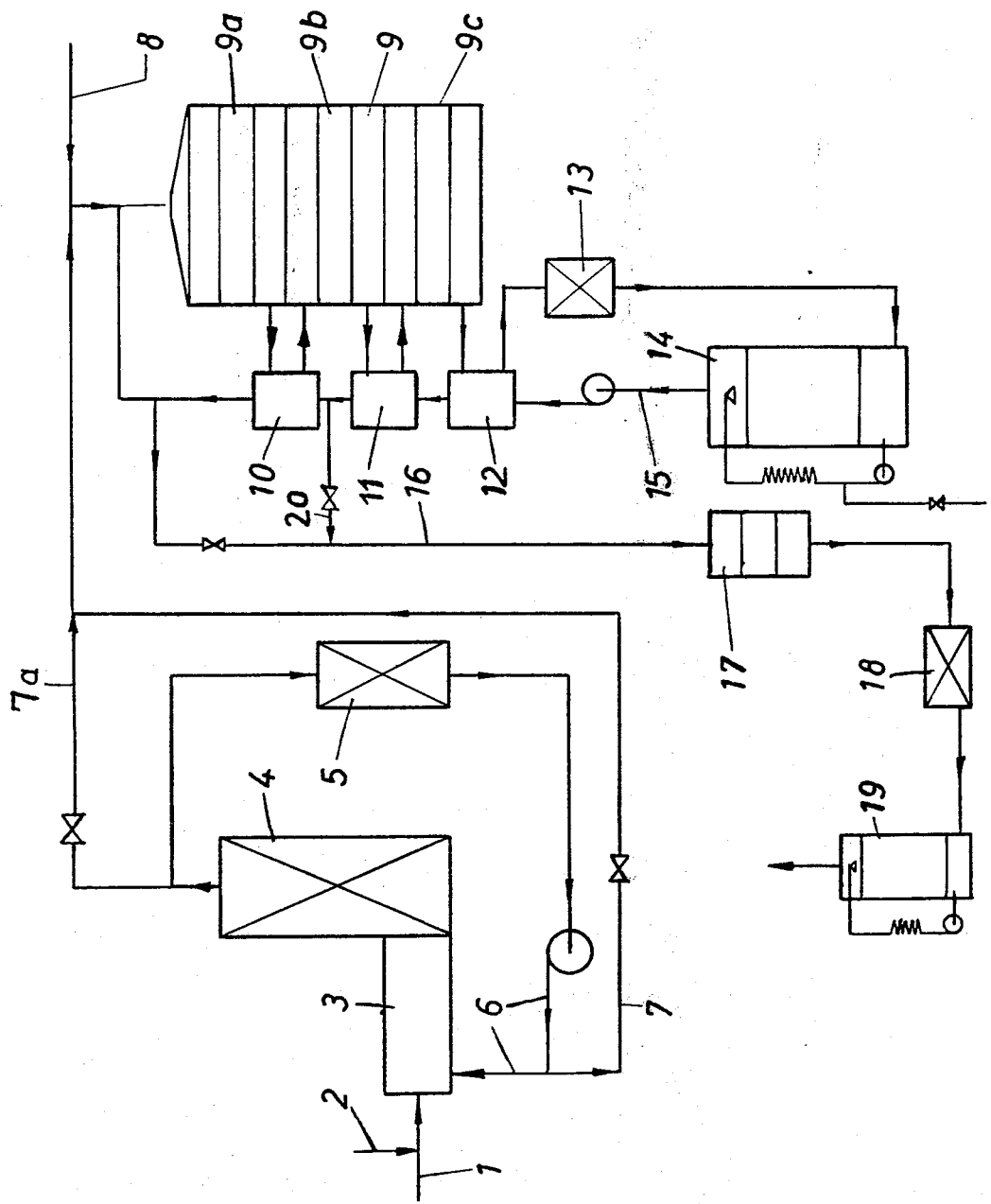

LOW SO₂ EMISSION SULFURIC ACID PROCESS FORM SULFUR AND OXYGEN

BACKGROUND OF THE INVENTION

A cycle process for the production of sulfuric acid from sulfur dioxide and oxygen has been disclosed in Canadian Chemistry and Process Industries (1947), pp. 1110–1114, wherein approximately 0.5% of the cycled gas is emitted directly to the atmosphere. The conversion of the plant is about 99.5%; this is an order of magnitude which, in the case of large-scale plants, still results in a considerable $SO_2$ emission into the atmosphere.

From DOS [German Unexamined Published Application] 1,767,587, a cycle process is known for the manufacture of sulfuric acid from sulfur combustion gases, wherein the gaseous mixture exiting from the absorption plant is fed, togther with technically pure oxygen and sulfur, into the sulfur combustion furnace after branching off a small amount of gas required for maintaining the nitrogen concentration in the cycle. During the recycling of the cycle gas through the sulfur combustion furnace, considerable amounts of gas must be conducted through the furance, and consequently the heat exchange surface of the waste heat boiler connected thereafter must also be dimensioned correspondingly large. Due to the higher nitrogen content in the combustion furnace on account of the recycled nitrogen-containing circulation gas, the danger of an undesired formation of nitrogen oxides occurs, and in order to avoid same, the combustion temperature is not to exceed about 1,000° C. As a consequence, a large heat exchange surface to recover the heat to necessary in the waste heat boiler.

OBJECTS OF THE INVENTION

An object of the present invention is to provide an improved cyclical process and apparatus which substantially avoids the disadvantages of the above-discussed processes. Upon further study of the specification and appended claims, further objects and advantages of this invention will become apparent to those skilled in the art.

SUMMARY OF THE INVENTION

According to the invention, there is provided a system comprising one or more of the following steps: reacting the sulfur with an oxygen containing gas containing at least 40 % by volume of molecular oxygen, e.g., technical oxygen or oxygen-enriched air, at temperature of between about 900° and 3,000° C., preferably between 1,000° and 1,600° C.; cooling the combustion gas to temperatures of between about 110° and 350° C.; and recycling a portion thereof, preferably 30 to 90 %, into the sulfur combustion zone, while oxidizing the other portion of the combustion gas, after adding at least an amount of oxygen stoichiometrically required for the contact oxidation, in a main contact stage; cooling the contact gas to 80–220° C.; absorbing the thus-formed sulfur trioxide from the contact gas; reheating the gas to temperatures of about 400°–450° C.; and feeding a portion thereof in the cycle, together with the portion of the sulfur combustion gas conducted to the contact stage, to the catalytic oxidation stage; and oxidizing the other portion of the gas at a post-contact stage and, after cooling, subjecting resultant post-contacted portion to a supplemental absorption step.

The gas circulating through the sulfur combustion furnace consists predominantly, especially to an extent of more than 90% by volume, of sulfur dioxide and contains preferably less than 2% by volume of oxygen. By varying the circulating amount of gas, the furnace temperature can be regulated so that optimum conditions are obtained for the waste heat boiler associated therewith. The sulfur is combusted at combustion temperatures of above 1,600° C., preferably, suitably directly in the boiler. The sulfur can also be combusted while passing straight through, if the temperature is maintained by means of cooling surfaces. When combusting sulfur in the waste heat boiler, an excess pressure of between 1 and 20 atmosphere gauge, preferably 2–10 atm. gauge, is advantageously employed on the gas side. Thereby, the boiler can be reduced with respect to size and expenditure.

The $SO_2$ content of the gas circulating through the contact and absorption plant is brought, prior to entrance into the first contact stage, to the concentration suitable for contact oxidation, preferably 8–11% by volume of $SO_2$, by the addition of gas from th sulfur combustion cycle. Since the cycle gas is also depleted in oxygen by the contact oxidation, this gas is likewise supplemented by the amount of oxygen consumed. The cycle gas, prior to entering the contact plant consists, for example, of 8–11% by volume of $SO_2$, 20–40% by volume of $O_2$, and 50–80% by volume of an inert gas (noble gas and nitrogen).

The sulfur combustion furnace operated with $SO_2$ circulation is distinguished by a small nitrogen content in the furnace atmosphere, so that it is possible to operate at a high combustion temperature almost without the formation of nitrogen oxide and with a relatively small waste heat boiler. In order to maintain a constant nitrogen concentration in the contact gas cycle, a portion of the reheated cycle gas is branched off and conducted via a post-contact stage with a supplemental absorption stage connected thereafter. The proportion of the gas branched off in this way depends mainly on the inert gas entrained into the cycles together with the oxygen. With the use of technical oxygen or oxygen-enriched air in accordance with this invention, only a comparatively small post-contact stage with preferably one to three contact units (hurdles) and a small supplemental post-absorption stage are required. The waste gas of the post-absorption stage consists essentially of nitrogen, noble gas, and other inert gases ($CO_2$). The very minor $SO_2$ content in the smaller amount of waste gas in the post-absorption results in a considerably lower atmospheric contamination by $SO_2$ than in the previously disclosed conventional plants.

In accordance with the preferred embodiment of the process of this invention, 50–99%, preferably 95 to 99.9 %. by volume of the gas from the first absorption is recycled into the main contact stage and 0.1–50%, preferably 0.5 to 5 %, by volume of this gas is fed to the post-contact stage. By the post-contact procedure, the $SO_2$ emission, which is small to begin with, is further reduced. The postcontact and post-absorption stages can, with such small amounts of gas, be dimensioned correspondingly small and represent only minor investment costs. The post-contact stage is so small that it is suitably housed in a separate, small contact vessel, rather than accommodating this stage in the same vessel as the contact units of the main contact stage.

The main contact stage through which the cycle gas is circulated consists preferably of 1 to 3 contact hurdles with a respectively associated heat exchanger. The waste gas from the first absorption stage is advantageously heated in these heat exchangers by means of the hot contact gases from these hurdles to the initiation (start-up) temperature of the first contact hurdle.

The process of this invention is distinguished by an extremely low $SO_2$ emission and a minor oxygen content in the waste gas.

The invention will be described hereinbelow with reference to the flow chart of a plant wherein sulfuric acid is produced in accordance with the process of the present invention.

In a sulfur combustion furnace 3 with waste heat boiler 4, liquid sulfur fed via conduit 1 is combusted to sulfur dioxide with technical oxygen supplied via conduit 2. The sulfur combustion gas gives off the largest portion of its heat in the waste heat boiler 4 and the feed water preheater 5 and is recycled through conduit 6 into the sulfur combustion furnace 3.

$SO_2$ gas is withdrawn from the $SO_2$ gas cycle through the sulfur combustion furnace 3 via conduits 7 and/or 7a and fed, together with technical oxygen supplied via conduit 8 and cycle gas returned via conduit 15, to the first hurdle 9a of the contact vessel 9. By selecting the ratio of the amounts of gas withdrawn through conduits 7 and 7a from the $SO_2$ gas cycle, the gas temperature required for the contact process can be set at the inlet of the contact vessel 9. After partial conversion in hurdle 9a and recooling in heat exchanger 10, the gas is further reacted in hurdle 9b, recooled in heat exchanger 11, and, after further conversion in the third hurdle 9c, cooling in heat exchanger 12 and feed water preheater 13, is introduced into the absorption tower 14. In the latter, the thus-formed $SO_3$ is removed from the gas with concentrated sulfuric acid. The waste gas of the absorption tower 14 is fed via conduit 15 to the heat exchanger 12; then, it is conducted successively through the heat exchanger 11 and 10, and, afer combining the gas with the $SO_2/O_2$ mixture from conduits 7 and 8, it is introduced into the contact vessel 9. The cycle gas is to be heated in the heat exchangers 12, 11, and 10 to such an extent that the mixture of cycle gas and $SO_2/O_2$ mixture has the start-up temperature of the first contact hurdle 9a.

In order to maintain a steady state inert gas concentration in the contact gas cycle, a portion of the gas is withdrawn via conduit 16 between the first heat exchanger 10 and the contact vessel 9, and is further reacted in the separate, small post-contact stage 17. The thus-formed minor $SO_3$ content is removed from the gas, after cooling the latter in heat exchanger 18, in a small final absorption tower 19. The final gas leaving the tower 19 consists essentially of nitrogen, noble gas, some oxgen, and traces of sulfur dioxide.

Since the start-up temperature of the post-contact stage 17 is lower than that of hurdle 9a of the main contact stage, a bypass line 20 is provided which connects the cycle conduit 15 between heat exchangers 10 and 11 with the conduit 16, by means of which it is possible to feed also less strongly heated cycle gas to the post-contact stage 17. By correspondingly adjusting the proportion of the amounts of cycle gas withdrawn upstream and downstream of the heat exchanger 10, respectively, with the aid of valves provided in conduits 20 and 16, it is possible to adjust the gas temperature to that required for the operation of the final contact stage 17 which is preferably about 400° to 420° C.

Without further elaboration, it is believed that one skilled in the art can, using the preceding description, utilize the present invention to its fullest extent. The following preferred specific embodiment is, therefore, to be construed as merely illustrative, and not limitative of the remainder of the disclosure in any way whatsoever. In the following example, all temperatures are set forth uncorrected in degrees Celsius; unless otherwise indicated, all parts and percentages are by weight.

EXAMPLE

Per hour, 1300 kg. of sulfur is reacted at 1,500° C. with 946 $Nm^3$ 98% oxygen in the sulfur combustion furnace 3 ($Nm^3$ is a cubic meter at 0° C. and 1 atmosphere absolute). The thus-produced gaseous $SO_2$ is cooled in the waste heat boiler 4 to 400° C. and, in the economizer, further cooled to 200° C. and recycled into the furnace 3.

Of the 3669 $Nm^3/h$. of circulated $SO_2$ gas, 926 $Nm^3/h$. is withdrawn and mixed with 454 $Nm^3/h$. of 98% oygen. This mixture is then introduced, together with 8,200 $Nm^3/h$. of cycle gas containing 13% by volume of $O_2$, 29% by volume of $N_2$, 57% by volume of noble gas and other inert gases, and still 1% by volume of $SO_2$, into the first hurdle 9a of the contact vessel 9 at a temperature of about 450° C. The contact gas from this hurdle is cooled in heat exchanger 10 from about 600° C. to about 450° C., then conducted through the contact hurdle 9b, cooled in heat exchanger 11 from about 500° C. to 420° C., and finally converted to an extent of about 90% in the contact hurdle 9c, and cooled in heat exchanger 12 from about 430° C. to about 280° C. and, in economizer 13, further down to 200° C.

After removing the thus-formed sulfur trioxide in the absorption tower 14, the cycle gas is heated in heat exchangers 12, 11, and 10 to 450° C. and returned into the contact vessel. Upstream and downstream of the heat exchanger 10, 36.4 $Nm^3/h$. of cycle gas is branched off, i.e., 0.4% by volume, wherein the ratio of the amounts of gas withdrawn upstream and downstream of the heat exchanger 10 is dimensioned so that a mixture temperature of about 420° C. is attained. After reaction of the gas in the post-contact stage 17 and cooling of the contact gas in heat exchanger 18 to about 200° C., the sulfur trioxide which is formed is removed from the gas in the small absorber 19. The absorber 19 discharges 35.9 $Nm^3h$. of final gas with about 12% by volume of $O_2$, 29% by volume of $N_2$, 59% by volume of noble gas and other inert gases, and 0.1% by volume of suflur dioxide.

The preceding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

where the term "technical oxygen" is used in the specification and claims, it is intended to define a gas containing at least 90 % oxygen.

What is claimed is:

1. A process for the production of sulfuric acid from sulfur and an oxygen-containing gas containing at least 40% by volume molecular oxygen comprising reacting the sulfur with said gas at about 900–3,000° C., to form an $SO_2$-containing combustion gas; oxidizing said combustion gas with oxygen in a main contact oxidation stage to form an $SO_3$-containing contact gas, absorbing said sulfur trioxide in a main absorption step to form a residual $SO_3$-lean gas; branching said $SO_3$-lean gas into portions thereof; heating and passing a first portion thereof into said main contact stage in admixture with said $SO_2$-containing, combustion gas an oxygen, heating a second portion of said $SO_3$-lean gas to a temperature less than that of said first portion and passing only heated second portion of $SO_3$ lean gas to a postcontact oxidation stage to convert residual $SO_2$ to $SO_3$, and subjecting resultant $SO_2$ depleted gas to a supplemental post-contact absorption step, said post-contact oxidation stage and supplemental post-contact absorption steps being conducted in equipment similar to, but separate and distinct from, and physically smaller than comparable equipment provided for the main contact oxidation stage and the main absorption step respectively.

2. A process according to claim 1 wherein 50–99.9% by volume of the $SO_3$-lean gas from the main absorption step is recycled into the main contact stage, and 0.1–1.50% by volume of the $SO_3$-lean gas is fed to the post-contact stage.

3. A process according to claim 1 wherein 95–99.9% by volume of the $SO_3$-lean gas from the main absorption step is recycled into the main contact stage and 0.5–5% by volume of the $SO_3$-lean gas is fed to the post-contact stage.

4. A process as defined by claim 1 wherein the $SO_3$-containing contact gas is cooled to 80°–220° C., prior to being passed to the main absorption stage.

5. A process as defined by claim 1 wherein said sulfur is burned with technical oxygen and the contact oxidation is conducted with technical oxygen.

6. A process as defined by claim 1, a portion of $SO_2$-containing combustion gas being cooled and recycled to the sulfur combustion stage, and said $SO_2$-containing combustion gas prior to being mixed with said first portion of $SO_3$-lean gas and entering the main contact stage being cooled to 110°–350°C.

7. A process as defined by claim 6 wherein the sulfur is burned in a waste heat boiler under a gauge pressure of 1–20 atmospheres.

8. A process according to claim 1 further comprising heating the $SO_3$-lean gas from the main absorption stage indirectly with hot gases from the main contact stage.

9. A process as defined by claim 8 wherein said $SO_3$-lean gas is heated to 400°–450° C., prior to being subjected to the post-contact stage.

10. A process as defined by claim 9, said $SO_3$-lean gas being heated to 400°–420° C. prior to being subjected to the post-contact stage.

11. A process as defined by claim 10, wherein the 400°–420° C. temperature of the $SO_3$-lean gas is obtained by mixing two streams of $SO_3$-lean gas having two different temperature levels.

* * * * *